UNITED STATES PATENT OFFICE.

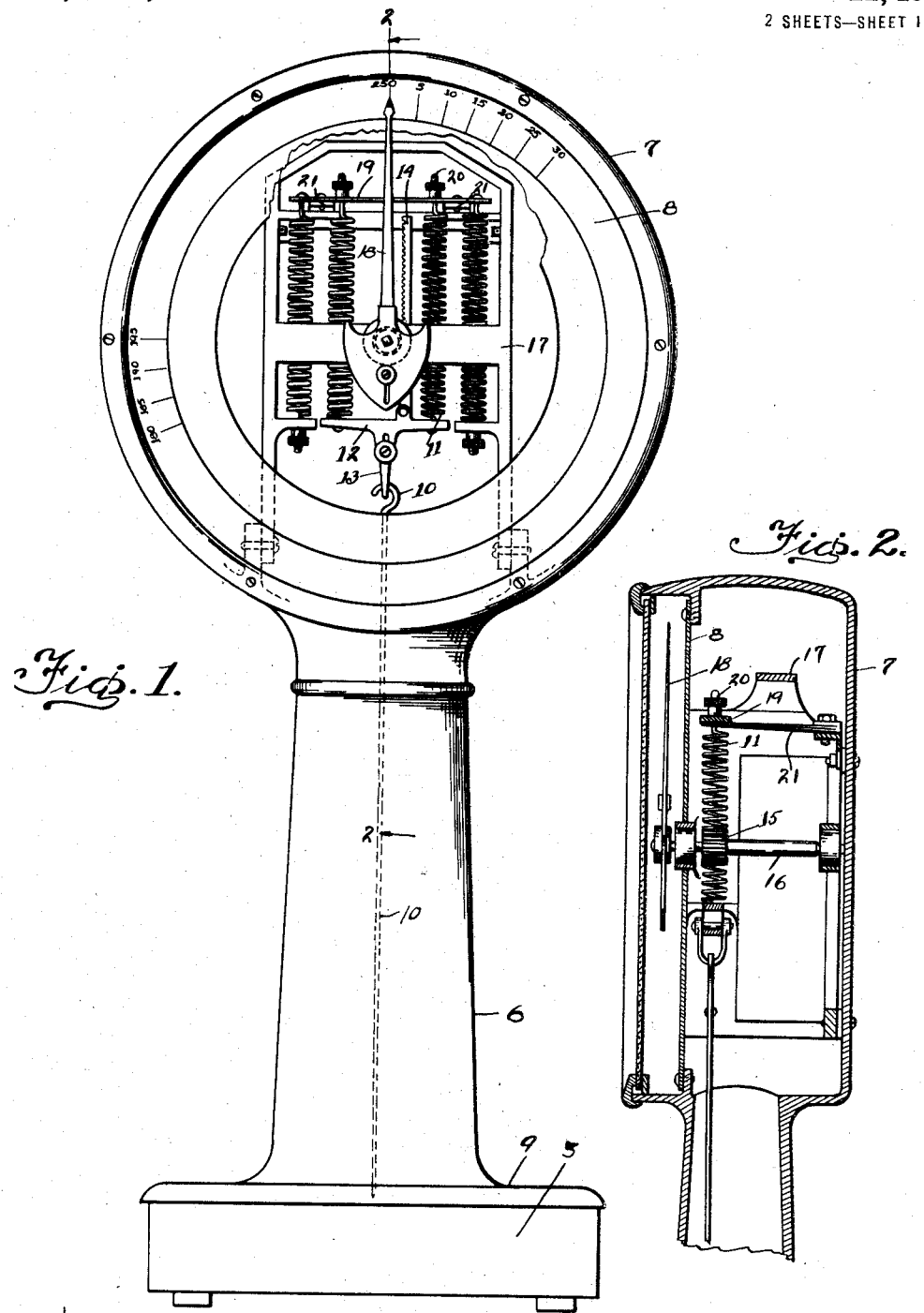

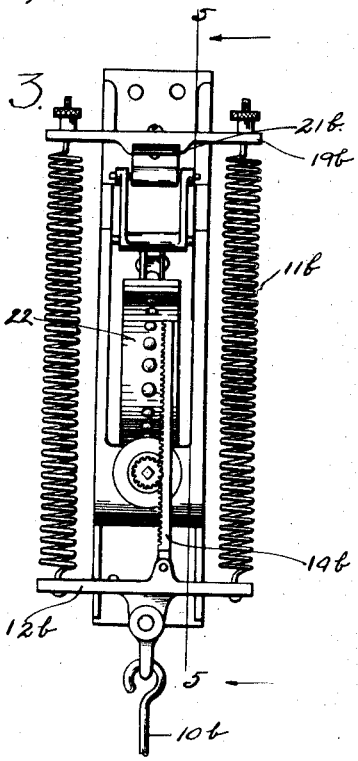
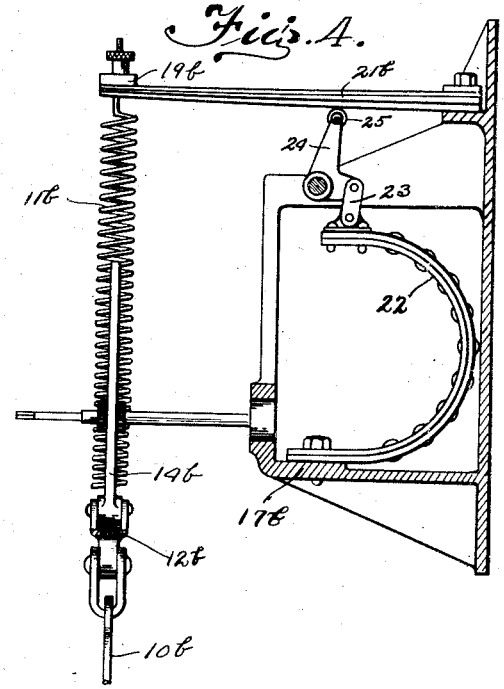
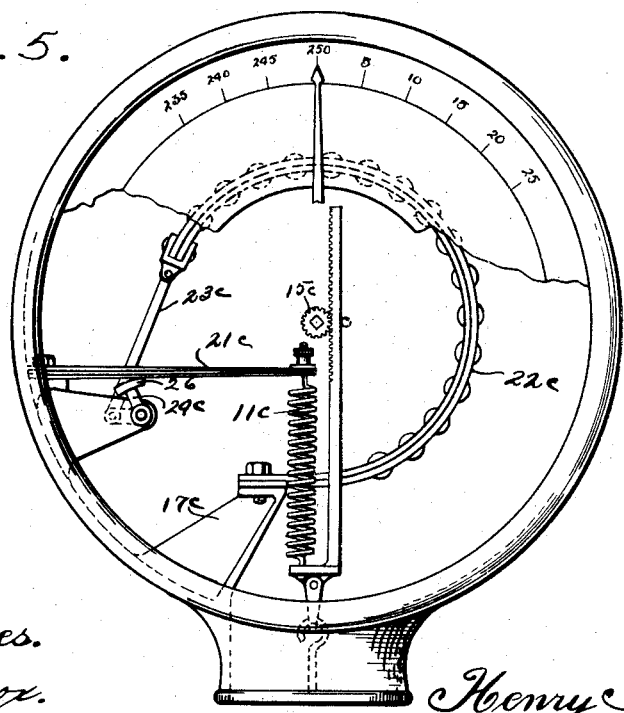

HENRY F. DUNN, OF INDIANAPOLIS, INDIANA, ASSIGNOR TO TOLEDO SCALE COMPANY, OF TOLEDO, OHIO, A CORPORATION OF NEW JERSEY.

SPRING-SCALE.

1,369,090.  Specification of Letters Patent.  Patented Feb. 22, 1921.

Original application filed May 10, 1916, Serial No. 96,509. Divided and this application filed April 10, 1919. Serial No. 288,928.

*To all whom it may concern:*

Be it known that I, HENRY F. DUNN, a citizen of the United States, residing at Indianapolis, in the county of Marion and State of Indiana, have invented certain new and useful Improvements in Spring-Scales, of which the following is a specification.

This invention relates to improvements in weighing scales, and more particularly to that type of scales in which the elongation and contraction of a spring or springs is relied upon to counteract the weight of a commodity placed upon the scale platform. It is well known that the tension of a spring, particularly a coil spring, varies with the rise and fall of the surrounding atmospheric temperature. For example, the tension of such spring weakens with a rise in the temperature from the normal degree of temperature at which the scale is adjusted, and the change and consequent weakening of the tension of the weighing springs is caused by the elongation and expansion of the wire in said springs and by the fibers of the metal becoming more or less elastic. As a consequence of these changes the weighing accuracy of a spring scale is constantly impaired and rendered unreliable, and the use of spring scales is objectionable on this account. To obviate this serious defect in this class of scales is the principal object of this invention. To this end the invention consists in adding to the usual load-counterbalancing springs of a scale a compensating abutment spring, the tension of which under temperature changes increases or decreases inversely to that of the load-counterbalancing springs, and so arranging the abutment springs between a fixed support and one end of the weighing springs as to provide means for automatically adjusting the position of the weighing springs to regulate the flexure of such springs under load in accordance with the prevailing temperature.

Other objects and advantages will readily appear from the following description, in which reference is had to the accompanying drawings illustrating preferred embodiments of my invention, and in which similar reference numerals refer to similar parts throughout the several views.

In the drawings:—

Figure 1 is a front elevation, with parts broken away, of a scale embodying one form of my invention;

Fig. 2 is a transverse sectional view taken substantially on the line 2—2 of Fig. 1;

Fig. 3 is a detail front elevation of the springs of a modified form of my invention employing a thermostatically actuated means for automatically increasing or decreasing the effective length of the regulating spring;

Fig. 4 is a side elevation thereof; and

Fig. 5 is a front elevation of the upper portion of a scale embodying a further modification of my thermostatically-actuated adjusting means.

This application is filed as a division of my application filed May 10, 1916, and bearing the Serial Number 96,509 which has eventuated in Patent No. 1,300,141, dated Apr. 8, 1919.

Referring to the embodiment shown in Figs. 1 and 2 of the drawings, a hollow base 5 supports at one end a column 6 upon which is mounted a casing 7 carrying the indicator chart 8 and the spring weighing mechanism of the scale. The base 5 is adapted to contain a leverage system (not shown) upon which is supported a goods-receiver or platform 9, as is common in scales of this character, and the leverage system is connected by the hook-rod 10 with the spring weighing mechanism. It is to be understood that any suitable platform and platform lever mechanism may be employed in connection with the spring weighing mechanism of the scale, the weighing mechanism herein shown being designed to satisfactorily operate when employed in various kinds of scales, as, for example, portable, dormant and hanging scales.

The spring weighing mechanism of the scale comprises a pair of load-counterbalancing springs 11 connected at their lower ends to an equalizer bar 12 which is pivotally connected, as by the link 13, with the upper end of the hook-rod 10, which, as above described, is connected at its lower end with the platform lever mechanism. The equalizer bar 12 also carries the rack rod 14 meshing with the pinion 15 fixed on the indicator shaft 16 which is suitably mounted in bearings on the framework 17 and carries at its forward extremity the index hand 18 coöperating with the chart 8 to indicate the weights of loads placed on the platform 9. The chart 8 is mounted concentrically of the indicator shaft 16 and is suitably graduated in any desired manner. Any suitable means may also be employed for maintaining effective contact between the teeth of the rack 14 and pinion 15 in the operation of the scale. The upper ends of the load-counterbalancing springs 11 are adjustably connected with a cross-bar 19, preferably on opposite sides of the center thereof. The upper ends of the equalizing springs 20 are also connected with the cross-bar 19 and are adjustably secured at their lower ends to brackets carried by the framework 17 of the scale, these equalizing springs 20 being of substantially the same mass as the weighing or counterbalancing springs 11 and of substantially the same length and diameter. The cross-bar 19 is secured to the free ends of laminated leaf abutment springs 21, the other ends of which are fixed, as shown in Fig. 2, upon the framework 17. The springs 21 are of sufficient strength and stiffness to normally support the bar 19 and the elements suspended therefrom, but the weight of the bar 19 and the elements connected thereto tend to put the springs 21 under considerable tension by bending the abutment springs downwardly, this tendency being augmented by the tension exerted thereon by the springs 11 and 20.

In the operation of the embodiment illustrated in Figs. 1 and 2, a load placed upon the platform 9 will exert a downward pull on the equalizer bar 12 through the steelyard rod 10, and this downward pull will serve to elongate the weighing springs 11, and also to slightly bend in a downward direction the leaf abutment springs 21. Thus, the offsetting of the weight of the load is distributed between the coil springs 11 and the leaf abutment springs 21. The equalizing springs 20 are not utilized in the weighing operations of the scale, but are employed solely to correct for changes in temperature, as will be now described. Supposing the scale to be sealed to a temperature of, say 65°, an increase in temperature will serve to expand and elongate the several springs, which, without corrective measures, would affect the accuracy of the scale. In my improved device the expansion of the weighing springs 11 and the equalizing springs 20 would be substantially equal, and would serve to counteract each other in correcting for inaccuracies due to change in temperature. Thus, the expansion of the weighing springs 11, considered alone, would relieve a portion of the tension in the regulating abutment springs 21 and also allow the equalizer bar 12 to fall a short distance under the weight of the steelyard rod 10 and the pull exerted thereon by the platform lever mechanism. On the other hand, the expansion of the equalizing springs 20 would serve to free only the abutment springs 21 from a portion of the tension exerted thereon and allow them to move upwardly to take up this expansion. In the combination, therefore, the additional upward movement allowed to the abutment springs 21 because of the expansion of the equalizing springs 20 would serve to lift the weighing springs 11 and the equalizer bar 12 a distance corresponding to that which the equalizer bar would fall under the expansion of the springs 11. In other words, the expansion of the equalizing springs 20 will serve to sufficiently relieve the tension normally exerted on the abutment springs 21 to permit the latter springs to take up any and all expansion in the weighing springs 11 so that the equalizer bar 12 and the rack carried thereby will remain in substantially their normal positions despite the temperature increase. Contraction of the springs 11 and 20 due to falling of the temperature would result similarly—the contraction of the equalizing springs 20 serving to bend the abutment springs 21 downwardly a sufficient distance to allow the springs 11 to contract without affecting the normal position of the equalizer bar and the rack 14.

In Figs. 3 and 4 I have substituted a thermostat and movable abutment contacting the laminated abutment springs for the equalizing springs 20 of my first-mentioned modification. The thermostat 22 is rigidly connected at one end to a bracket carried by a frame 17$^b$ and pivotally connected at its other end, as through the link 23, with the lower arm of a bell-crank-lever 24 mounted on said frame, the upper arm of which carries a roller 25 contacting the laminated abutment spring 21$^b$. The weighing springs 11$^b$ are connected at their upper ends to a cross-bar 19$^b$ which is suitably secured to the free end of the laminated spring 21$^b$, as shown in Fig. 4. The lower ends of the weighing springs 11$^b$ are connected to the equalizer bar 12$^b$ which carries the rack 14$^b$ and is connected through the steelyard rod 10$^b$ with a suitable goods-receiver. The thermostat 22 herein shown is constructed of two metals—for example, brass and steel, rigidly united, with the former metal on the inside. The shape of the thermostat is preferably that of a horse-shoe in order to obtain a greater amount of movement therefrom in a limited amount of space. I do not intend to limit myself to any particular form of thermostat, and disclose the thermostat shown merely as one method that has been found to work satisfactorily in the scale.

The weighing operation of the embodiment shown in Figs. 3 and 4 is substantially identical with that of the embodiment illustrated in Fig. 1, the weight of a load being offset by both the weighing springs 11$^b$ and the laminated abutment spring 21$^b$. When the temperature rises from that to which the scale is sealed, the expansion of the thermostat 22 moves the roller 25 carried by the lever 24 toward the free end of the spring 21$^b$ so as to place the abutment roller farther from the fixed end of the spring, thereby stiffening this spring and raising the free end thereof a distance sufficient to take up the expansion in the weighing springs 11$^b$. A falling of the temperature will result in the contraction of the thermostat 22 to move the abutment roller 25 toward the fixed end of the leaf spring 21$^b$, relieving the tension in said spring and allowing it to fall sufficiently to counteract for the contraction in the weighing springs 11$^b$.

The modification shown in Fig. 5 illustrates the use of a single weighing spring 11$^c$ in connection with a single laminated spring 21$^c$. In this embodiment I have illustrated an arrangement wherein a thermostat 22$^c$ of substantial length may be compactly employed in a scale, said thermostat having one end fixed to a bracket 17$^c$ carried by the casing of the scale and then encircling the pinion 15$^c$ and the rack and having its other end connected, as by the link 23$^c$, with a bell-crank-lever 24$^c$ having its end formed as a curved abutment 26. During temperature changes the thermostat 22$^c$ will serve to move the abutment 26 toward or away from the fixed end of the laminated spring 21$^c$, thereby varying the tension in and raising or lowering the pring 21$^c$ to allow for the expansion or contraction of the weighing spring 11$^c$.

While the embodiments herein illustrated disclose constructions well adapted to adequately fulfil the objects of the invention primarily stated, it will be understood that my invention is susceptible to modification, variation and change within the spirit and scope of the subjoined claims.

Having described my invention, I claim:

1. In a spring scale, a goods-receiver, a counterbalance spring, connections from the lower end of the counterbalance spring to the goods-receiver, a regulating abutment spring fixed at one end upon the scale and having its opposite end connected to the upper end of the counterbalance spring and normally held under tension thereby, and thermostatically-actuated means engaging the abutment spring adjacent its point of engagement with the counterbalance spring for varying the tension of said abutment spring in accordance with temperature changes, said means including a lever arranged to be moved along the abutment spring.

2. In a spring scale, a goods-receiver, a counterbalance spring, connections from the lower end of the counterbalance spring to the goods-receiver, a regulating abutment spring fixed at one end upon the scale and having its opposite end connected to the upper end of the counterbalance spring and normally held under tension thereby, a thermostat, and a lever having one arm connected to the thermostat and its other arm in engagement with the abutment spring, whereby the tension of said abutment spring may be varied in accordance with temperature changes.

3. In a spring scale, a goods-receiver, a counterbalance spring, connections from the lower end of the counterbalance spring to the goods-receiver, a regulating abutment spring fixed at one end upon the scale and having its opposite end connected to the upper end of the counterbalance spring and normally held under tension thereby, a thermostat, and a bell-crank-lever having one arm connected to the thermostat and its other arm in engagement with the abutment spring whereby the tension of said abutment spring may be varied in accordance with temperature changes.

4. In a spring scale, a goods-receiver, a counterbalance spring, connections from the lower end of the counterbalance spring to the goods-receiver, a regulating abutment spring fixed at one end upon the scale and having its opposite end connected to the upper end of the counterbalance spring and normally held under tension thereby, a longitudinally-curved thermostat, and a bell-crank-lever having one arm connected to the thermostat and its other arm in engagement with the abutment spring, whereby the tension of said abutment spring may be varied in accordance with temperature changes.

HENRY F. DUNN.

Witnesses:
ANNA M. MAYER,
B. D. AUFDERHEIDE.